United States Patent [19]

Ueno et al.

[11] 3,792,669

[45] Feb. 19, 1974

[54] HYBRID FUEL BURNING SYSTEM

[75] Inventors: Zene Ueno, Tokyo; Tadahiko Nagaoka, Tokorozawa; Katsuaki Kosaka; Akira Morita, both of Tokyo; Seiki Koga, Iruma; Fumio Wagatsuma, Kawagoe, all of Japan

[73] Assignee: Nissan Motor Company, Limited, Yokohama, Japan

[22] Filed: Feb. 1, 1973

[21] Appl. No.: 328,637

[30] Foreign Application Priority Data
Feb. 2, 1972  Japan.............................. 47-12047
Feb. 21, 1972 Japan.............................. 47-17933

[52] U.S. Cl.............. 110/1 H, 60/39.82 C, 110/1 J, 110/18 R
[51] Int. Cl................................................ F23g 7/00
[58] Field of Search........... 110/1 H, 1 J, 8 R, 18 R; 60/39.82 C; 23/288 R

[56] References Cited
UNITED STATES PATENTS
3,085,393  4/1963  Hamlin, Jr. .................... 60/39.82 X
3,106,059  10/1963 Ledwith ......................... 60/39.82 X
3,120,738  2/1964  Webb............................. 60/39.82 X
3,518,828  7/1970  Bradford et al.................. 60/39.82

Primary Examiner—Kenneth W. Sprague

[57] ABSTRACT

To reduce the overall dimensions of a fuel burning system using a solid or semisolid fuel and to eliminate the toxic compounds in the exhaust gases from the system, the solid or semisolid fuel is combusted with the agency of a liquid oxidizer which may be liquid oxygen or liquid hydrogen peroxide. The liquid oxidizer is exothermically decomposed in the presence of a suitable catalyst and produces hot oxygen gas by which the solid or semisolid fuel is liquidized or gasified and combusted. The hot oxygen gas may be passed through at least one preheating chambers so that the fuel is preheated and emulsified before it mixes with the hot oxygen gas. The solid or semisolid fuel may be formed of waste plastic materials which are solidified to a block form, thereby contributing to resolution of the contamination problems resulting from the scraps and garbage of used plastic products. By reason of the compact and small-sized construction, the fuel burning system is compatible with driving or heating sources of mobile or portable equipment such as power driven vehicles.

15 Claims, 10 Drawing Figures

HYBRID FUEL BURNING SYSTEM

The present invention relates to fuel burning systems and, more particularly, to a hybrid fuel burning system which uses a solid or semisolid fuel of polymers such as polyurethane rubber and a liquid oxidizer such as hydrogen peroxide.

Typical of the existing fuel burning systems operable on the solid or semisolid fuels are the pulverized coal burning systems, travelling-grate stokers and stationary-grate furnaces. All these fuel burning systems operate in such a manner that the solid or semisolid fuels are heated, liquidized and gasified or volatilized directly by the heat generated by the combustion of the fuel. The combustion principle of this character requires considerably large-sized conbusters, combustion chambers, heat-exchangers, air inlet ports and smokestacks as compared with the fuel burning systems using liquid fuels such as kerosene, heavy oil and gasoline. Applications of the fuel burning systems using the solid or semisolid fuels are, therefore, limited because of the large-sized overall constructions and severe floor space requirements of the systems. The solid or semisolid fuels have thus been practically incompatible with the fuel burning systems or driving sources to be installed on mobile or portable plants and equipment such as power driven vehicles. The present invention comtemplates provision of a fuel burning system using the solid or semisolid fuel and featuring a compact and small-sized construction which will do justice to placement of the fuel burning system in a limited working space of a mobile or portable plant or equipment or even of a household equipment.

A tremendous amount of scraps and garbage of plastic products such as used one-way containers of polyethylene are presently discarded and various efforts are being made in quest of processes adapted to dispose of the waste plastic materials from the view point of eliminating the contamination problems resulting from such materials. The fuel burning system herein proposed is operable on a solid or semisolid fuel which is prepared from the waste plastic materials and is, therefore, expected to significantly contribute to reclamation of the waste plastic materials and accordingly to reduction of the contamination resulting from such materials.

The fuels, which may be solid, liquid or gaseous, in the prior art fuel burning systems are generally combusted with the agency of oxygen which is contained in air. The fuel burning systems therefore tend to emit exhaust gases containing unburned or partly burned hydrocarbons and other harmful chemicals such as carbon monoxide and nitrogen oxides. A variety of attempts have accordingly been made with a view to reducing the toxic compounds in the exhaust gases from the fuel combustion systems. For the purpose of reducing the carbon monoxide and unburned hydrocarbons in the exhaust gases, for instance, it is important to have the fuels burned at increased combustion efficiencies and at sufficiently elevated temperatures so as to achieve the complate combustion of the fuels. The increased combustion efficiencies and the elevated combustion temperatures are, however, responsible for the production of the toxic nitrogen oxides and, thus, numerous expedients have thus far been proposed to provide compromises between the mutually conflicting requirements for the reduction of the carbon monoxide and unburned hydrocarbons and for the reduction of the nitrogen oxides in the exhaust gases. It is, however, apparent that the conflicting requirements could not be satisfactorily met with insofar as air is used as the oxidizing agent for the fuels in the fuel burning systems, because it is the air which is responsible for the formation of the nitrogen oxides in the exhaust gases. The present invention thus proposes to use a liquid oxidizer which is composed at least partially of hydrogen peroxide or liquid oxygen so that the exhaust gases emitted from the fuel burning systems are perfectly or at least practically cleared of the toxic nitrogen oxides even though the fuels are burned at increased combustion efficiencies and at elevated temperatures that are appropriate to reduce or eliminate the carbon monoxide and unburned hydrocarbons.

It is, thus, an important object of the present invention to provide an improved hybrid fuel burning system which uses a solid or semisolid fuel and a liquid oxidizer containing hydrogen peroxide or liquid oxygen.

It is another important object of the invention to provide an improved hybrid fuel burning system having a compact and small-sized construction which is compatible with any mobile or portable plants and equipment such as power driven land vehicles, boats and ships, marine equipment and aircraft or with various household equipment such as home boilers and heaters. In view of the fact that the fuel burning system according to the present invention is operable in the absence of air as the oxidizing agent, the fuel burning system will prove especially useful as the driving source for underwater operations where air is extremely thin or absent.

It is still another important object of the invention to provide an improved hybrid fuel burning system which is operable on a solid or semisolid fuel formed of waste plastic materials and which will therefore contribute to reduction of the contamination problems resulting from the waste plastic materials.

It is still another important object of the invention to provide an improved hybrid fuel burning system emitting substantially clean exhaust gases which are clear of nitrogen oxides even though the fuel burning system is operated under conditions adapted to achieve complete combustion of the fuel so as to eliminate unburned hydrocarbons and carbon monoxide in the exhaust gases.

These and other objects of the present invention will be accomplished in a hybrid burning system which comprises means to supply a liquid oxidizer, a fuel storage chamber for storing a solid or semisolid fuel therein and having at least one fuel discharge passageway, a flame chamber into which the fuel discharge passageway is open at its leading end, catalyst means for decomposing the liquid oxidizer and producing a hot oxygen gas, the catalyst means having at least one outlet to the flame chamber for directing the hot oxygen gas into the flame chamber, and fuel feed means for feeding the solid or semisolid fuel into the flame chamber through the fuel discharge passageway at a controlled rate for fluidizing the fuel in contact with the hot oxygen gas and combusting the fluidized fuel with the agency of the hot oxygen gas in the flame chamber. Where desired, the fuel burning system having the above described general construction may further comprise at least one preheating means for preheating the solid or semisolid fuel before the fuel is admitted into the flame chamber through the fuel discharge passageway. The preheating means may comprise, in one preferred form, at least one preheating compartment which is in contact with the fuel discharge passageway of the fuel storage chamber. In this instance, the preheating compartment may be in communication with the means to supply the liquid oxidizer and accommodate therein the catalyst means so that the liquid oxidizer is decomposed to produce the hot oxygen gas in the preheating chamber for heating the fuel being passed in the fuel discharged passageway and is admitted into the flame chamber through the outlet of the catalyst means. In another preferred form, the preheating means may comprise a plurality of heat transfer elements each of which is in contact at one end with the catalyst means and at the other end with a leading end of the solid or semisolid fuel advancing into the flame chamber through the fuel discharge passageway so that the heat produced in the catalyst means through decomposition of the liquid oxidizer is at least partially transferred to the leading end of the fuel.

The fuel operable in the fuel burning system herein proposed may be not only the solid fuel but substantially semisolid fuel which may be in a clayey, gelatinous or gelled state or of a slurry or lump form at normal temperatures. Where the waste plastic materials are to be utilized as the fuel for the burning system, the plastic materials should be formed or molded under compression to a block form of a stock size. The solid or semisolid fuel of any of the above mentioned natures will be hereinafter called a non-fluied fuel so as to be clearly distinguished from the usual liquid or gaseous fuel.

The oxidizer used as the agent to oxidize the non-fluid fuel thus defined may be either liquid hydrogen peroxide or liquid oxygen. Where the hydrogen peroxide is utilized as the oxidizing agent for the fuel, the hydrogen peroxide will exothermically decompose into water and oxygen and produces heat of a temperature reaching, say, about 700°C. Since, in this instance, the mixture of the water and oxygen produced by the exothermic decomposition of the hydrogen peroxide contains nascent oxygen in a considerable proportion, the hot gases admitted to the flame chamber will have an extremely high chemical activity so that the fuel contacting the hot gases is oxidized substantially instantaneously and at a sufficiently high efficiency to produce water and carbon dioxide at a temperature of the order of 2,000°C. The temperature of this particular order is high enough to achieve the complete combustion of the fuel which may be in the form of hydrocarbons so that not only the nitrogen oxides are contained in the exhaust gases in the absence of element nitrogen in the oxidizer but the exhaust gases are completely clear of the carbon monoxide and unburned hydrocarbons. Similar effects will be apparently achieved where the liquid oxygen is utilized as the oxidizing agent for the fuel.

The features and advantages of the fuel burning system according to the present invention will become more evident from the following description of various embodiments of the system with reference to the accompanying drawings in which like reference numerals designated corresponding parts and elements throughout the figures and in which.

Figure 1:
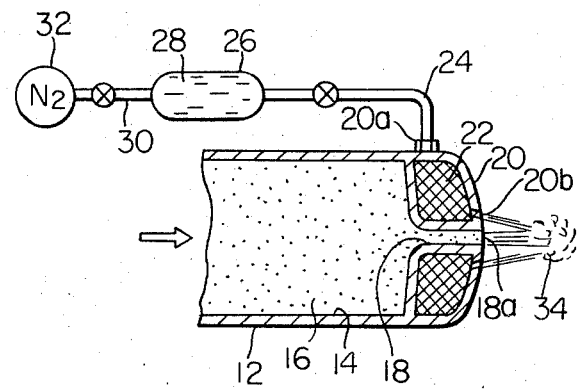
FIG. 1 is a longitudinal sectional view schematically showing an overall construction of a preferred embodiment of the fuel burning system according to the present invention.
Figure 2:
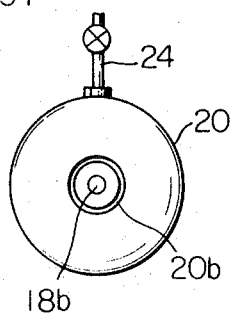
FIG. 2 is a front end view of a combustion unit of the fuel burning system illustrated in FIG. 1.

Reference will now be made to the accompanying drawings, first to FIGS. 1 and 2. As illustrated in FIG. 1, the fuel burning system embodying the present invention comprises a combustion unit including a fuel container 12 which is formed with a generally cylindrical fuel storage chamber 14 to store therein a non-fluid fuel 16 and a fuel discharge passageway 18 leading from the fuel storage chamber 14 and terminating at an outlet 18a which is located at a forward end of the fuel container 12. The fuel discharge passageway 18 is in a generally tubular or nozzle form which is aligned with a longitudinal direction of the fuel storage chamber 14. Suitable fuel feed means (not shown) is positioned at the rear end of the fuel container 12 and advances the non-fluid fuel 16 in the direction of arrow in FIG. 1 toward the fuel discharge passageway 18 at a controlled rate. As previously noted, the non-fluid fuel 16 is of the nature which is solid, gelatinous or gelled or in a slurry or lump form at normal temperatures and may be a block of molded or otherwise solidified waste plastic materials of, for example, used polyethylene containers.

The combustion unit further comprises a generally annular fuel preheating chamber 20 which is positioned at a forward end of the fuel container 12 and surrounds the fuel discharge passageway 18. The fuel preheating chamber 20 is packed or otherwise filled with a catalyst 22 of a material which is usually based on silver, copper or nickel. The preheating chamber 20 is formed with an inlet port 20a which is in communication through a valve passageway 24 with a container 26 storing a liquid oxidizer such as liquid hydrogen peroxide 28. The oxidizer container 26, in turn, is in communication through a valved passageway 30 with a pressure accumulator 32 which is filled with a suitable fluid under pressure for forcing the liquid hydrogen peroxide 28 to be delivered from the container 26 into the fuel preheating chamber 20 through the valve passageway 24 and the inlet port 20a during operation. It is, in this instance, important that the fluid thus stored in the pressure accumulator 32 for driving the liquid hydrogen peroxide 28 out of the oxidizer container 26 be chemically inert to the hydrogen peroxide and is, for this reason, preferably pressurized nitrogen gas. The hydrogen peroxide which is directed into the fuel preheating chamber 20 is exothermically decomposed into water and oxygen in the presence of the catalyst 22 and produces heat of an elevated temperature of the order of, say, 700°C as previously noted. The fuel preheating chamber 20 is further formed with an annular outlet port 20b surrounding the outlet 18a of the fuel discharge passageway 18, as will be better seen in FIG. 2. The fuel forced into the fuel discharge passageway 18 is thus heated and fused by the heat from the preheating chamber 20 before it is allowed out of the outlet 18a of the passageway 18.

Ahead of the forward end of the fuel container 12 is positioned a flame chamber (not shown) which forms part of the combustion unit. The outlet 18a of the fuel discharge passageway 18 and the annular outlet port 20b of the fuel preheating chamber 20 are thus opened into the flame chamber so that the fused fuel injected into the flame chamber through the outlet 18a of the fuel discharge passageway 18 is finely atomized and mixed with the hot oxygen spurting into the flame chamber through the outlet port 20b of the fuel preheating chamber 20. Flames 34 are consequently produced ahead of the outlets 18a and 20b of the passageway 18 and preheating chamber 20, respectively as a result of the combustion of the fuel in the flame chamber. These flames 34 will lend themselves to accelerating the liquidization and atomization of the fuel which is about to emerge from the fuel discharge passageway 18 into the flame chamber.

Figure 3:
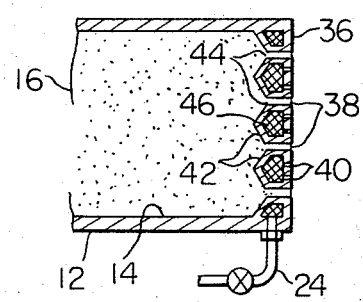
FIG. 3 is a longitudinal sectional view showing a combustion unit of another preferred embodiment of the fuel burning system according to the present invention.
Figure 4:
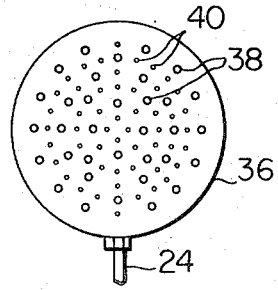
FIG. 4 is a front end view of the combustion unit illustrated in FIG. 3.

FIGS. 3 and 4 illustrate another preferred embodiment of the fuel burning system according to the present invention. The fuel burning system herein shown operates on a combustion principle which is essentially similar to that of the system illustrated in FIGS. 1 and 2 but is now constructed to form the flames over an increased area in the flame chamber. Referring to FIG. 3, the combustion unit includes a fuel container 12 which is formed with a generally cylindrical fuel storage chamber 14 accommodating therein a non-fluid fuel 16 which is movable toward a forward end of the container 12, similarly to the combustion unit shown in FIG. 1. This fuel container 12 has a forward end wall 36 formed with spaced first and second apertures 38 and 40, respectively, which are substantially uniformly distributed throughout the working area of the end wall 36, as better seen in FIG. 4. A number of spaced fuel preheating compartments 42 are formed on an inner face of the thus apertured end wall 36. These fuel preheating compartments 42 are located in such a manner that they define therebetween a plurality of fuel discharge passageways 44 terminating respectively in the first apertures 38 and are opened to the flame chamber (not shown) through the second apertures 40. The fuel discharge passageways 44 thus defined between the adjacent preheating compartments 42 merge each at one end into the fuel storage chamber 14 and open at the other into the flame chamber. The individual fuel preheating compartments 42 carry therein catalysts 46 of the silver- copper- or nickel-based material of preferably pellet or tablet forms and are in communication through a common valved passageway 24 to the previously described source of the liquid oxidizer such as the liquid hydrogen peroxide though not shown in FIGS. 3 and 4. By virtue of the provision of the increased numbers of fuel and oxidizer injection outlets, the combustion unit of the construction shown in FIGS. 3 and 4 will be suited for applications in which enhanced combustion efficiencies are major requirements of the fuel burning system. The fuel preheating compartments 42 may be disposed in concentrical, staggered, grilled, matrix or any other suitable pattern in so far as the first and second apertures 38 and 40, respectively, are so distributed as to permit the fuel in the discharge passageways 44 to be fused, atomized and mixed with the hot oxygen gas at satisfactory efficiencies.

Figure 5:
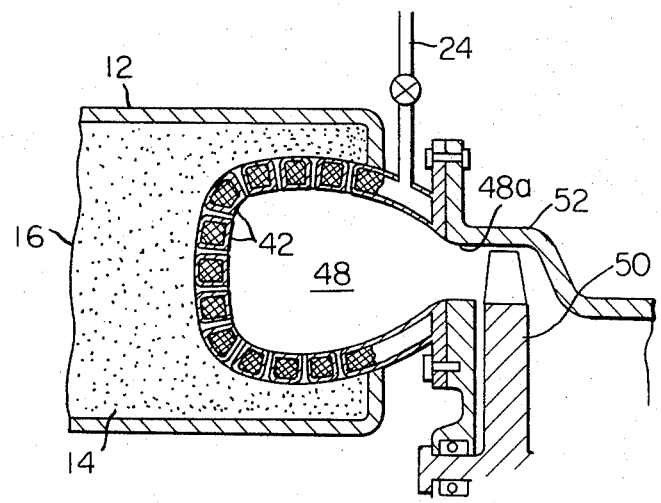
FIG. 5 is a longitudinal sectional view showing an example of the practical application of the fuel burning system which is constructed essentially similarly to the system illustrated in FIG. 3.

FIG. 5 illustrates an example in which the combustion unit of the construction essentially similar to that shown in FIGS. 3 and 4 is installed on a turbine for the driving of turnine blades thereof. The fuel preheating compartments 42 of the combustion unit herein shown are so disposed as to define a flame chamber 48 which protrudes inwardly of the fuel container 12 so that the fuel 16 adjacent the compartments 42 is subjected to the heat from the compartments 42 over an increased area. The flame chamber 48 has an outlet 48a which is located in proximity to an outer rim of a turbine blade 50 so that the hot combustion gases produced in the flame chamber 48 impart a pressure to the turbine blade 50 for driving the blade for rotation within a turbine casing 52. The arrangement above described is merely by way of example and the fuel burning system of any of the constructions herein described may be successfully realized in various other driving and heat generating equipment such as rocket or other propulsion engines.

Figure 6:
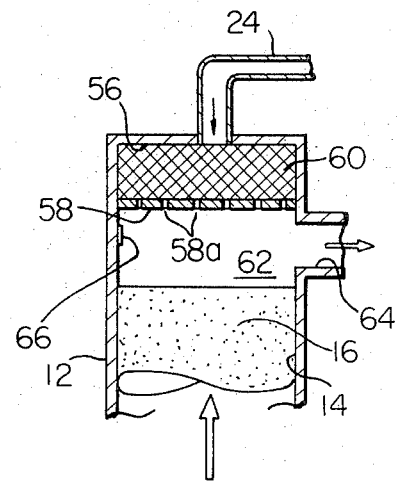
FIG. 6 is a longitudinal sectional view showing a combustion unit of still another preferred embodiment of the fuel burning system according to the present invention.

FIG. 6 illustrates still another preferred form of combustion unit which is operable in the fuel burning system embodying the present invention. As shown in FIG. 6, the fuel combustion unit invariably comprises a fuel container 12 having a generally cylindrical fuel storage and feeding chamber 14 through which a non-fluid fuel 16 is forced to advance in the direction of arrow. Ahead of the fuel storage and feeding chamber 14 is positioned and oxidizer decomposition chamber 56 through a partition wall 58 which is formed with a number of apertures 58a. The oxidizer decomposition chamber 56 accommodates therein a catalyst 60 of the described nature and is in communication through a valved passageway 24 with the source of the liquid hydrogen peroxide to be used as the oxidizing agent for the fuel 16. The apertured partition wall 58 of the oxidizer decomposition chamber 56 is in a vis-a-vis relation to the leading end of the non-fluid fuel 16 advancing toward the chamber 56 and thus defines a flame chamber 62 between the partition wall 58 and the end face of the fuel 16. While, during operation, the hot oxygen is injected into the flame chamber 62 as a result of the exothermic decomposition of the hydrogen peroxide in the oxidizer decomposition chamber 56 due to the presence of the catalyst 60, the non-fluid fuel 16 advancing toward the apertured partition wall 58 has its leading end exposed into the flame chamber 62 at a controlled rate and fused and atomized by the heat of the oxygen gas applied thereto. The fuel 16 is consequently combusted at its end portion contacting the hot oxygen gas in the flame chamber 62 and the resultant combustion gases are discharged from the flame chamber through a combustion gas discharge passageway 64 and passed over to a suitable driven member such as a turbine blade.

Where the oxygen gas is utilized in lieu of the hydrogen peroxide as the oxidizing agent for the fuel 16, suitable igniting means such as an ignition plug 66 may be located in the flame chamber 62 for positively firing the mixture of the oxygen gas and the atomized fuel in the flame chamber.

Figure 7:
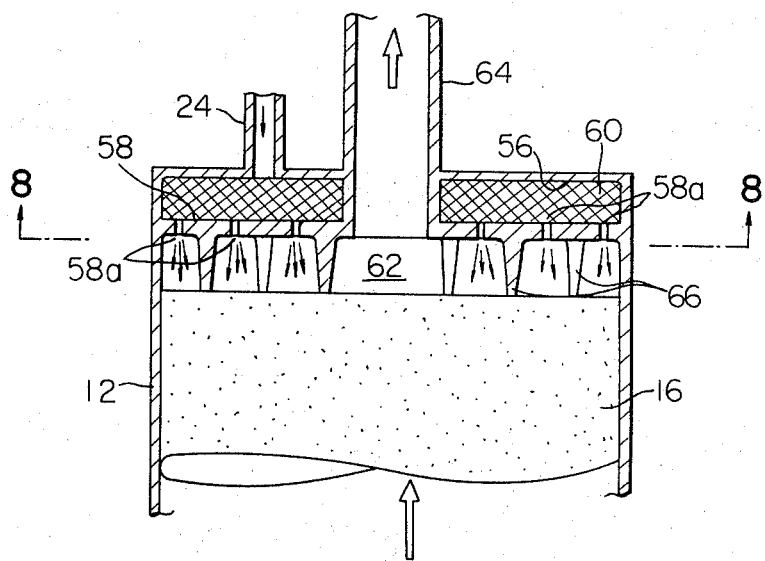
FIG. 7 is also a longitudinal sectional view showing a modification of the combustion unit illustrated in FIG. 6.
Figure 8:
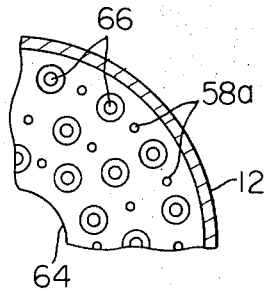
FIG. 8 is a fragmentary cross sectional view taken on line 8—8 of FIG. 7 for illustrating a preferred example of the configuration of the preheating means incorporated in the combustion unit shown in FIG. 7.
Figure 9:
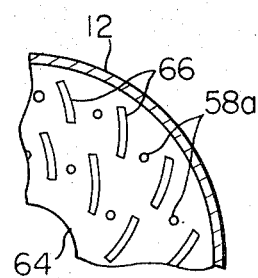
FIGS. 9 and 10 are views similar to FIG. 8 but illustrate other preferred configurations of the preheating means to form part of the combustion unit shown in FIG. 7.
Figure 10:
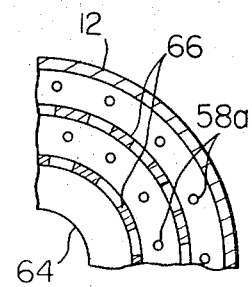

FIG. 7 illustrates a modification of the combustion unit shown in FIG. 6. The combustion unit herein shown includes, in addition to those parts which are incorporated in the combustion unit illustrated in FIG. 6, a plurality of spaced projections 66 which extend from the apertured partition wall 58 toward the leading end of the non-fluid fuel 16 through the flame chamber 62. The intent of these projections 66 is to limit the displacement of the fuel 16 approaching the partition wall 58 and to transfer the heat from the oxidizer decomposition chamber 56 to that portion of the fuel 16 which is exposed to the flame chamber 62. The projections 66 thus serve to maintain constant the capacity of the flame chamber 62 and the area of the fuel 16 exposed to the flame chamber and to accelerate the volatization of the fuel in the flame chamber so that the combustion of the fuel proceeds in a stabilized condition and at an increased efficiency. These projections 66 may be configured and distributed in any desired manner insofar as the above described intent thereof is satisfactorily accomplished, examples of the configurations and patterns of the projections 66 being illustrated in FIGS. 8 and 10. In FIG. 1, the projections 66 are configured as tapered columns which are substantially equidistantly spaced apart from each other and substantially uniformly distributed in the flame chamber 62. The projections 66 shown in FIG. 9 are curved plates which are substantially equidistantly spaced apart from each other along a circumference of the flame chamber 62 and positioned substantially helically with respect to the axis of the flame chamber. Referring to FIG. 10, substantially concurrent annular walls are mounted on the partition wall 58 and are formed with substantially equidistantly spaced apertures with the result that the projections 66 are formed between adjacent apertures.

The combustion discharge passageway 64 of the combustion unit shown in FIG. 7 is assumed to be led outwardly of the flame chamber through a central portion of the oxidizer decomposition chamber 56 which is consequently shown as having an annular configuration.

Various preferred embodiments of the fuel burning systems according to the present invention have thus far been described but it should be borne in mind that such embodiments are by way of illustration of the combustion principle of the fuel burning system herein proposed and that numerous modifications may be incorporated in the described embodiments where desired and depending upon the applications on which the fuel burning system is to be placed. In controlling the rates of supply of the fuel and oxidizing agent to the combustion unit, moreover, control means may be provided in the system according to the present invention so that such rates are controlled in relation to the pressure built up in the flame chamber or various operational variable of the combustion unit or the equipment powered by the combustion unit.

What is claimed is:

1. A hybrid fuel burning system which comprises, in combination, oxidizer supply means for supplying a liquid oxidizer, a fuel storage chamber for storing a non-fluid fuel therein and including at least one fuel discharge passageway, a flame chamber into which said fuel discharge passageway is open, catalyst means for decomposing said liquid oxidizer and producing hot oxygen gas, said catalyst means having at least one outlet to said flame chamber for directing the hot oxygen gas into the flame chamber, and fuel feed means for feeding said non-fluid fuel into said flame chamber through said fuel discharge passageway for fluidizing the fuel contacting with the hot oxygen gas and combusting the fluidized fuel with the agency of the hot oxygen gas in said flame chamber.

2. A hybrid fuel burning system as claimed in claim 1, further comprising fuel preheating means for preheating said non-fluid fuel before the fuel is admitted to said flame chamber through said fuel discharge passageway by said fuel feed means.

3. A hybrid fuel burning system as claimed in claim 2, in which said fuel preheating means comprises at least one fuel preheating compartment which is in contact with said fuel discharge passageway.

4. A hybrid fuel burning system as claimed in claim 3, in which said at least one fuel preheating chamber is in communication with said oxidizer supply means and accommodates therein said catalyst means so that said liquid oxidizer is decomposed and produces said hot oxygen gas in the fuel preheating chamber for heating the fuel passed through said fuel discharge passageway.

5. A hybrid fuel burning system as claimed in claim 2, in which said fuel preheating means comprises a plurality of heat transfer elements each of which is in contact at one end with said catalyst means and at the other with a leading end of said non-fluid fuel advancing into said flame chamber through said fuel discharge passageway so that the heat produced in the catalyst means through decomposition of said liquid oxidizer is at least partially transferred to said leading end of the fuel.

6. A hybrid fuel burning system as claimed in claim 1, in which said non-fluid fuel is in a substantially solid state.

7. A hybrid fuel burning system as claimed in claim 1, in which said non-fluid fuel is in a substantially semi-solid state.

8. A hybrid fuel burning system as claimed in claim 1, in which said non-fluid fuel is formed of waster plastic materials which are solidified to a block form.

9. A hybrid fuel burning system as claimed in claim 1, in which said liquid oxidizer contains liquid oxygen.

10. A hybrid fuel burning system as claimed in claim 1, in which said liquid oxidizer contains liquid hydrogen peroxide.

11. A hybrid fuel burning system as claimed in claim 10, in which said catalyst means comprises a catalytic material which is based on metal selected from the group consisting of silver, copper and nickel.

12. A hybrid fuel burning system comprising, in combination, oxidizer supply means for supplying a liquid oxidizer, a fuel storage chamber for storing a non-fluid fuel therein, a flame chamber, a fuel discharge passageway leading from said fuel storage chamber and having an outlet to said flame chamber, fuel feed means for feeding said non-fluid fuel into said flame chamber through said fuel discharge passageway, a fuel preheating chamber surrounding said fuel discharge passageway and having an inlet in communication with said oxidizer supply means and an outlet which is open into said flame chamber and which is located in proximity to said outlet of said fuel discharge passageway, and a catalyst which is positioned in said fuel preheating chamber for decomposing said liquid oxidizer directed thereinto from said oxidizer supply means and producing hot oxygen which heats and substantially fluidizes the fuel being passed through said fuel discharge passageway toward said flame chamber and which is thereafter injected into said flame chamber for combusting the fluidized fluid injected into the flame chamber from said fuel discharge passageway.

13. A hybrid fuel burning system comprising, in combination, oxidizer supply means for supplying a liquid oxidizer, a fuel storage chamber for storing a non-fluid fuel therein, a flame chamber positioned adjacent a forward end of said fuel storage chamber, a plurality of fuel discharge passageways leading from said fuel storage chamber and having respective outlets which are open into said flame chamber, fuel feed means for feeding said non-fluid fuel into said flame chamber through said fuel discharge passageways, a plurality of fuel preheating compartments which are in contact with said fuel discharge passageways and which communicate with said oxidizer supply means, each of said fuel preheating compartments having at least one outlet which is open into said flame chamber, and a plurality of catalysts which are positioned respectively in said fuel preheating compartments for decomposing said liquid oxidizer directed thereinto from said oxidizer supply means and producing hot oxygen which heats and substantially fluidizes the fuel being passed through said fuel discharge passageways toward said flame chamber and which is thereafter injected into the flame chamber for combusting the fluidized fuel injected into the flame chamber from said fuel discharge passageways.

14. A hybrid fuel burning system comprising, in combination, oxidizer supply means for supplying a liquid oxidizer, an oxidizer decomposition chamber having an inlet communicating with said oxidizer supply means, a catalyst which is positioned in said oxidizer decomposition chamber for decomposing the liquid oxidizer directed into the chamber and producing hot oxygen gas therein, a flame chamber positioned adjacent to said oxidizer decomposition chamber through a partition wall formed with a plurality of apertures through which said hot oxygen gas is injected into the flame chamber, a fuel storage and feeding chamber storing therein a non-fluid fuel and having a forward end which is open into said flame chamber, and fuel feed means for forcing said non-fluid toward said flame chamber so that a leading end of the fuel is continuously admitted to the flame chamber and exposed to and accordingly combusted by said hot oxygen gas.

15. A hybrid burning system as claimed in claim 14, further comprising a plurality of projections formed on said partition wall and extending toward said leading end of the fuel through said flame chamber for limiting the movement of the fuel toward the partition wall and transferring heat from said oxidizer decomposition chamber directly to said leading end of the fuel.

* * * * *